US006212263B1

(12) United States Patent
Sun et al.

(10) Patent No.: US 6,212,263 B1
(45) Date of Patent: Apr. 3, 2001

(54) 5 VOLTS SINGLE POWER SUPPLY ADSL ANALOG FRONT END DESIGN

(75) Inventors: Ting Sun; Robert F. Watts, both of Houston, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/164,136

(22) Filed: Sep. 30, 1998

(51) Int. Cl.[7] .................................................. H04M 11/00
(52) U.S. Cl. .................................. 379/93.28; 379/90.01; 379/93.05
(58) Field of Search ....................... 379/93.28, 102.04, 379/90.01, 93.05, 93.31, 93.08; 375/222; 713/340

(56) References Cited

U.S. PATENT DOCUMENTS

| 5,793,809 | * | 8/1998 | Holmquist | 375/222 |
| 5,794,058 | * | 8/1998 | Rensick | 395/750.05 |
| 5,841,840 | * | 11/1998 | Smith et al. | 379/93.01 |
| 5,903,615 | * | 5/1999 | Thomson et al. | 375/346 |
| 5,905,781 | * | 5/1999 | McHale et al. | 379/93.28 |
| 5,964,879 | * | 10/1999 | Dunstan et al. | 713/340 |

FOREIGN PATENT DOCUMENTS

409185521A * 7/1997 (JP) .................................. G06F/1/22

* cited by examiner

Primary Examiner—Curtis Kuntz
Assistant Examiner—Melur Ramakrishnaiah
(74) Attorney, Agent, or Firm—Akin, Gump, Strauss, Hauer & Feld, L.L.P.

(57) ABSTRACT

A combination x digital subscriber line (xDSL) and analog modem including a computer bus interface, codecs, an analog front end (AFE) for xDSL communications coupled to a plain old telephone service (POTS) line and a direct access arrangement (DAA) for analog communications also coupled to the POTS line. The modem is designed on a peripheral component interconnect (PCI) card. Generally, ±12, 5 and 3.3 volts are available for PCI components. Traditionally, the AFEs for non-PCI modems were designed to operate on ±12 volts for differential POTS line driving. For differential POTS line driving, the AFE typically requires a regulated voltage. However, ±12 volts supplied to PCI cards are typically not as well regulated as the 5 and 3.3 volts, and therefore the ±12 volts is generally unsuitable for PCI modem AFE design. Furthermore, in computers that operate in different power management modes, ±12 volts may not be available to the PCI card while 5 and/or 3.3 volts may be available to the PCI card in certain power management modes. In one embodiment, the AFE operates on 5 volts. Power for the modem is made available from other parts of the computer supply in these power management modes.

23 Claims, 6 Drawing Sheets

| COMPUTER SYSTEM POWER MANAGEMENT MODES | VOLTAGES SUPPLIED TO PCI CARDS |
|---|---|
| OFF | NONE |
| SLEEPING | 5 AND/OR 3.3 VOLTS |
| WORKING | +/- 12, 5 AND 3.3 VOLTS |

5 VOLTS SINGLE POWER SUPPLY ADSL ANALOG FRONT END DESIGN

SPECIFICATION

BACKGROUND OF THE INVENTION

1. Field of the Invention

The present invention relates to modems in a computer system, and more specifically to an analog front end of a x Digital Subscriber Line (xDSL) modem.

2. Description of the Related Art

Improvements in computer hardware price/performance ratios during the last decade have caused major shifts in both home and office computing environments. Advances in semiconductor technology have enabled the appearance of personal computers with a computing power equivalent to supercomputers available a decade ago. Further, the advent of high performance audio and graphics subsystems have turned the personal computer into a multimedia device capable of delivering multimedia entertainment to the computer user.

Multimedia is a relatively new capability for computer systems. Multimedia refers to the delivery of information that combines different content formats. For example, these different formats may include a motion video, audio, still images, graphics, animation and text. Historically, magnetic media, such as floppy disk, was the medium of choice for providing multimedia content. Due to the limited storage capabilities of floppy disks, multimedia on floppy disks were limited to small programs such as unsophisticated games, with little graphics details and low quality sound.

Newer multimedia mediums such as compact disk-read only memory (CD-ROM) provide greater storage capabilities. In addition to games, CD-ROMs in the form of digital video disks (DVDs) contain full-length movies. While DVDs continue to exist, other means for providing multimedia to computer systems have become available and newer methods are being developed.

Another multimedia medium called the Internet, and more specifically the World Wide Web (WWW) has gained rapid acceptance among computer users. The WWW is a system of documents and multimedia files that can be retrieved and viewed by any person who has access to the Internet.

The WWW is simply a series a communications and protocols representative of information and documents that could be linked to other documents and stored on computers throughout the Internet. The users of the Internet can access documents or pages via program called a browser. Although earlier browsers were text-only, today's browsers offer windows-based icons, pull-down menus, bit-map graphics and telephone links to display hypertext documents. Furthermore, the web standard presents a system independent graphical user interface for users.

Due to its ability to tie together many disparate sources in its unified, easy to access interface, the WWW is rapidly gaining acceptance as an information delivery media. The accessibility of audio and image files such as video over the WWW is also enabling the Internet to become a central depository suitable for entertainment as well.

Historically, users accessed the Internet via a modem which coupled the computer to an Internet Service Provider (ISP) over a standard plain old telephone service (POTS) line. Originally designed for voice communications, the POTS lines include twisted copper wire pairs, amplifiers and filters. The copper wire pairs were strung from a telephone central office (CO) to various customer premises.

The CO is considered to be a first level switching facility. The COs are then connected to a higher level switching facility and these higher level switching facilities are connected to even higher level switching facilities. The connection of all of these switching facilities form a public switched telephone network (PSTN).

Besides the Internet, other multimedia sources are available to the computer user, such as video on demand, and live broadcasts. Video on demand typically refers to the ability to retrieve various video entertainment programming at the touch of a button. For example, such programming may include movies. Video on demand provides the user the convenience of watching a program at home at their own leisure. Live broadcasts are similar to video on demand, except the programs are live, e.g., a sporting event.

Historically, video on demand and live broadcast services, were provided to customers over the air or by video cables. Transmission over the air or via cable was needed because of the high band width requirements for such services. Typically, for instance, to obtain video on demand services, a customer would have to install a satellite dish for reception. Although satellite dish sizes have decreased over the years (0.3 meters), some customers may not be able to install the satellite dish due to city ordinances or neighborhood covenants. In addition, weather conditions such as snow and rain may affect satellite dish reception. Furthermore, satellite dish users require a clear line of sight between the satellite dish and satellite. Structures, such as trees or other buildings, may affect signal reception. Although not typically affected by weather conditions or line of sight requirements, video on demand via cable TV may not be available to the customer due to the high cost of running a cable to their premise, especially for customers living in rural areas.

An emerging standard known as x digital subscriber line (xDSL) is a modem technology that transforms ordinary POTS lines into high speed digital lines for ultra-fast data access. xDSL also enables access to the Internet, reception of video on demand, video catalogs, and live broadcasts, as well as exciting new interactive multimedia applications such as multi-player gaming.

The xDSL modem has, so far as is known, include an analog front end (AFE) for interfacing the modem to the POTS lines. The AFEs are traditionally powered by ±12 volt power supplies. The AFEs typically used ±12 volts for efficient differential POTS line driving. For xDSL modems designed on a peripheral component interconnect (PCI) card, operating on ±12 volts may not be desirable. For instance, although ±12, 5 and 3.3 volts are normally made available to the components on the PCI card, in certain computer modes, such as sleeping or low power modes, ±12 volts may not be available.

It is often desirable to have the modem operate even when the computer is in the sleeping mode or low power modes. In these modes, it might be desirable to have a fully operable modem to maintain a communications link with the other modem, else the communications link may drop out or fail. In addition, when the computer is operating in these modes, the modem may be able to receive data, such as electronic mail.

Furthermore, POTS line drivers typically require regulated voltages. Some voltages are not well regulated for PCI cards, e.g., ±12 volts might not be as well regulated as the 5 and 3.3 volt supplies. It might be possible to regulate the ±12 voltages on the PCI card, however, this would increase cost, and be subject to space constraints from already limited board real estate. In addition, ±12 voltages on the PCI card typically require additional power planes, which may result in additional board layers and subsequent introduction of additional noise.

SUMMARY OF THE INVENTION

Briefly, the present invention is a combination analog and digital modem which has a computer system interface, codecs, an x asymmetric digital subscriber line (XDSL) analog front end (AFE), and a direct access arrangement (DAA). The modem is typically a PCI card that can be installed in a computer system. In the analog mode, the modem processes International Telecommunications Union (ITU) v.90 signals at speeds of 56 kbps. In the digital mode, the modem processes xDSL signals, at upstream (terminal to host) speeds of 640 kbps, and downstream (host to terminal) speeds of 8 Mbps. One version of xDSL such as universal—asymmetric digital subscriber line (U-ADSL) (also known as G.LITE) signals, processes U-ADSL signals, at upstream speeds of 384 kbps, and downstream speeds of 1.5 Mbps.

The computer system interface includes the hardware and software for processing computer processor data to the modem, and processing modem data to a computer processor. The modem has two codecs, one for analog transmission operation, such as ITU v.90, and the other for digital transmission operation, such as xDSL. The AFE provides the necessary circuitry for interfacing the modem to a plain old telephone service (POTS) line for digital transmission. The DAA provides the necessary circuitry for interfacing the modem to the POTS line for analog transmission.

The AFE circuitry includes line drivers, receivers, filters, hybrid receiving circuits for echo rejection, and transformers. To transmit and receive xDSL signals over POTS lines, the line drivers and receivers typically require well-regulated voltages. Generally, noise and signal distortions are reduced with well-regulated voltages. PCI cards are typically provided with a well-regulated 5 volts.

In addition, the modem complies with industry specifications, such as Microsoft ONNOW and Intel/Microsoft/Toshiba Advanced Configuration and Power Interface (ACPI) specifications. These specifications include, among other things, power management modes of a computer system. The power management modes specify among other things, what voltages are available to the PCI cards. The power management mode includes a working mode, a sleeping mode or low power, and an off mode. When the computer system is in the working mode and sleeping mode or lower power, the well-regulated 5 volts is made available to the PCI modem. Thus, although the computer system may be sleeping, the PCI modem is still connected and can still reliably send and receive data.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF INVENTION

Figure 1:
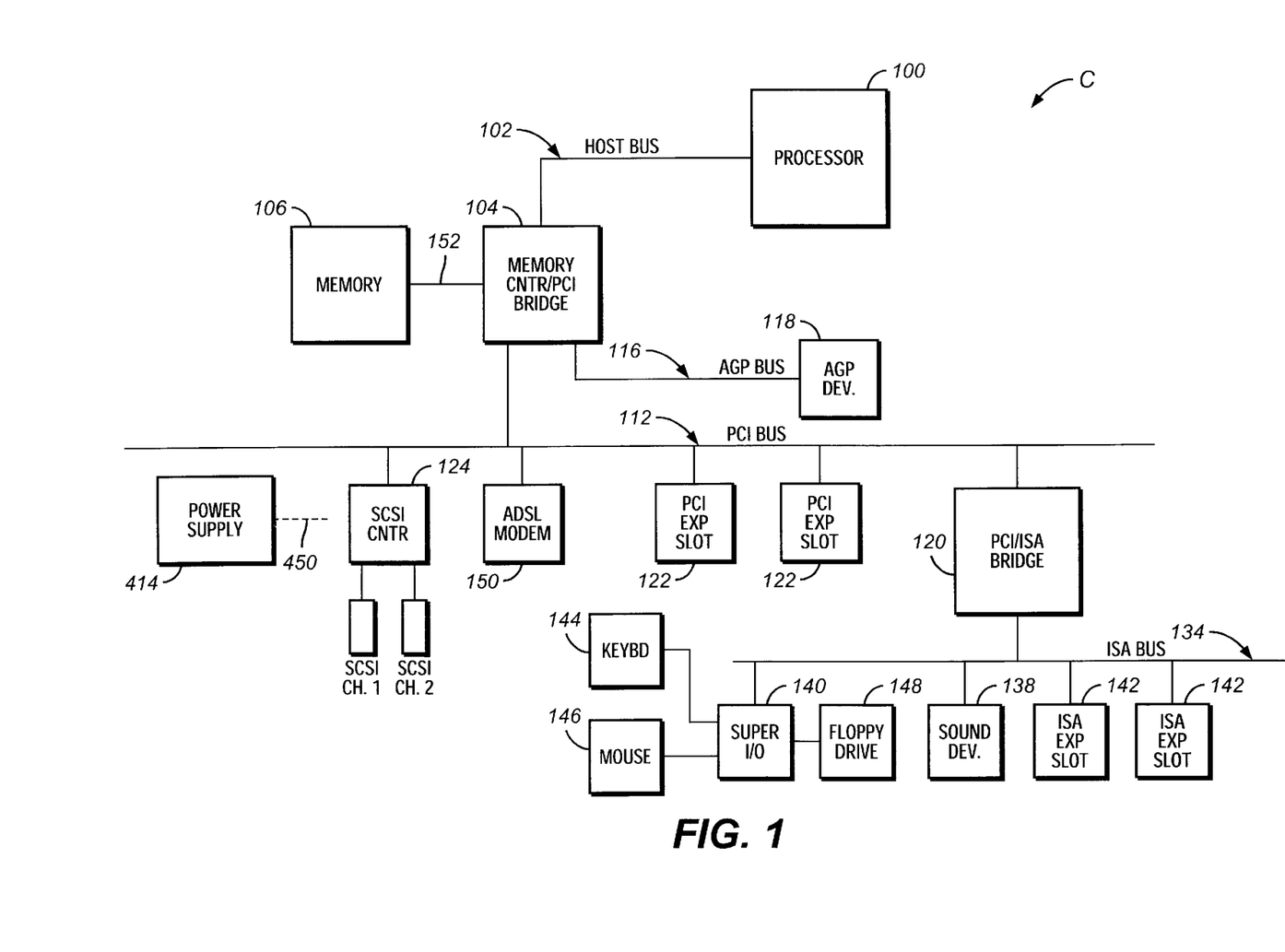
FIG. 1 is a block diagram of a computer system according to the present invention.

Turning now to FIG. 1, a computer system C according to the present invention is illustrated. The computer system C includes a processor 100. The processor 100 is coupled to a host bus 102.

Also coupled to the host bus 102 is a chipset, namely a memory controller/host-to-PCI/APG (advanced graphics port) bridge 104. The memory controller/host-to-PCI/APG bridge 104 provides address and control signals to a memory 106 via line 152. The memory 106 can be comprised of a plurality of dynamic random access memory (DRAM) devices (not specifically shown). In addition, the memory controller/host-to-PCI/APG bridge 104 translates processor cycles into peripheral component interconnect (PCI) cycles, and vice versa, for connecting to a PCI bus 112. Furthermore, the memory controller/host-to-PCI/APG 104 also translates processor cycles into AGP cycles, and vice versa, for connecting to a AGP bus 116. An AGP device 118 is coupled to the AGP bus 116. The AGP device 118 provides the necessary interface to a monitor (not specifically shown).

Also connected to the PCI bus 112 is a PCI/ISA (peripheral component interconnect/industry standard architecture) bridge 120, a SCSI (small computer serial interface) controller 124, a NIC (network interface controller) device 126, a 1394 controller (or FIREWIRE) device 128, a modem card 150, and one or more PCI expansion slots, each designated as 122. The PCI cards, such as the modem card 150, are coupled to PCI bus power lines 450. A power supply 414 typically provides ±12, 5 and 3.3 volts to the PCI cards via the PCI bus power lines 450.

The PCI/ISA bridge 120 translates PCI cycles to ISA cycles, and vice versa, for connecting to an ISA bus a sound device 138, a super I/O device 140, and one or more ISA expansion slots 142. Also coupled to the super I/O device 140 are a keyboard 144 and a mouse 146. A floppy drive 148 is coupled to the super I/O device 140.

Figure 2:
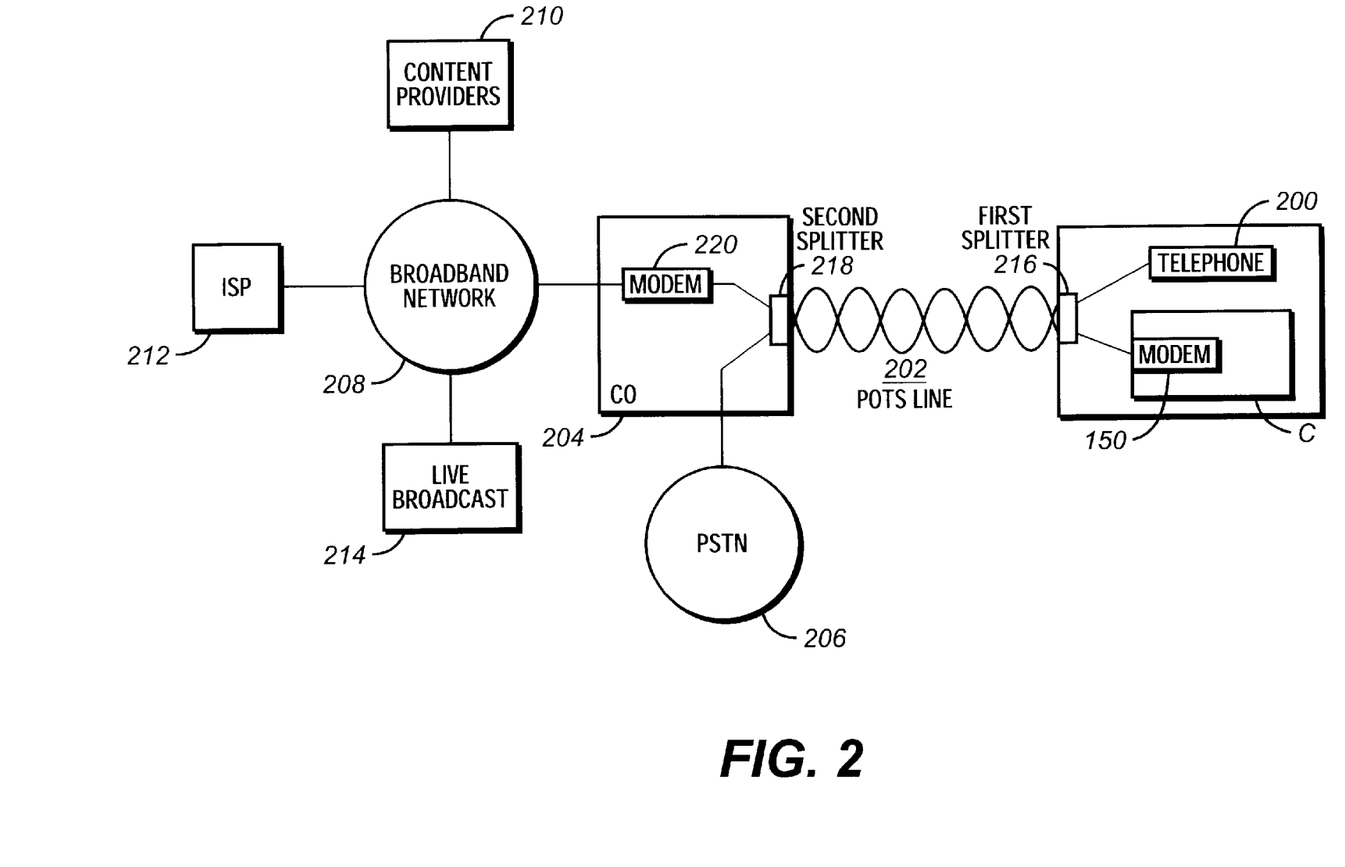
FIG. 2 is a network topology layout of an xDSL data network.

FIG. 2 illustrates an xDSL network architecture according to the present invention. A modem 150 internally located in computer C is coupled to a POTS line 200. A telephone 202 can also be coupled to the POTS line 200.

X digital subscriber line (xDSL) refers to a modem technology that converts existing twisted pair telephone lines, such as POTS lines, into access paths for multimedia and high speed data communications. The "x" in xDSL signifies that digital subscriber line (DSL) has different versions. For example, one version known as asymmetric digital subscriber line (ADSL) includes ADSL modems on each end of the twisted-pair telephone line, typically creating three information channels—a high speed downstream (host to terminal) channel, a medium speed duplex (or upstream—terminal to host) channel, and a POTS or an integrated services digital network (ISDN) channel. The POTS/ISDN channel is split off from the digital mode by filters (in some versions of xDSL, no filters are necessary), thus providing uninterrupted POTS/ISDN, even if ADSL fails. An interface standard for ADSL is specified in American National Standards Institute (ANSI) T1.413, Issue 2 (herein incorporated by reference in its entirety).

The high speed downstream channel generally ranges from 1.5 to 6.1 Mbps (although ADSL is designed to operate up to 8 Mbps, ANSI standards specify rates up to 6.1 Mbps), while duplex rates generally range from 16 to 640 kbps. The downstream data rates depend on a number of factors, including the length of the copper twisted-pair lines, its wire gauge, and line impairments, such as the presence of bridged taps and cross-coupled interference. In addition, line attenuation increases with line lengths and frequencies, and decreases as wire diameters increase. Ignoring bridged taps ADSL downstream transmission rates will typically perform as follows:

| Data rate | Wire Gauge | Distance |
|---|---|---|
| 1.5 or 2 Mbps | 24 AWG | 18,000 feet |
| 1.5 or 2 Mbps | 26 AWG | 15,000 feet |
| 6.1 Mbps | 24 AWG | 12,000 feet |
| 6.1 Mbps | 26 AWG | 9,000 feet |

Another variation of xDSL is Universal—ADSL (U-ADSL). Also known as G.LITE, U-ADSL is designed to be a mass-market, consumer oriented version of ADSL. ADSL requires installation of a signal "splitter" (or filter) to separate voice and data channels. This installation would normally require a technician to install a splitter at each customer premise thereby increasing customer cost. In U-ADSL, there is no need for the "splitter" to be installed at the customer premise.

Figure 3:
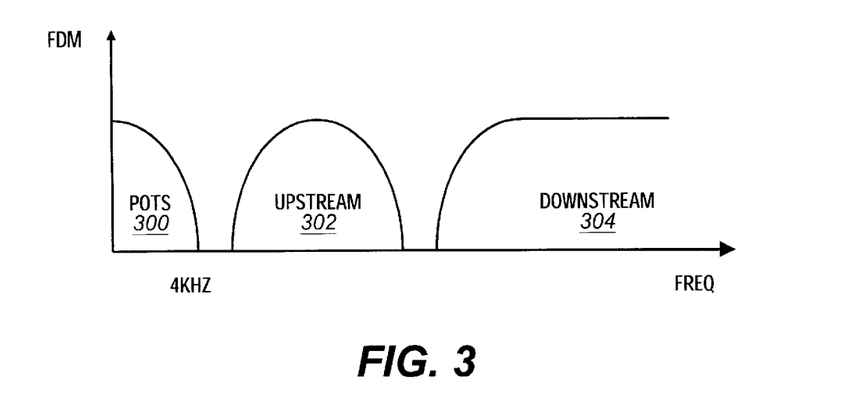
FIG. 3 illustrates the frequency spectrum of xDSL data communications.

In addition, U-ADSL is designed with reduced power requirements, consequently lower speeds. The looser requirements are believed to be acceptable trade-offs, resulting in reduced complexity of installation and lower cost of implementation. U-ADSL downstream transmission speeds are typically up to 1.5 Mbps and 384 kbps upstream. U-ADSL is about 25 times the speed of the current highest-speed analog modem technology. Current analog modems provide a maximum transmission speed of 56 kbps. (As mentioned previously, ADSL enables transmission speeds up to 8 Mbps, and at this speed, the service is known as full-rate ADSL). U-ADSL is designed to be interoperable with full-rate ADSL.

xDSL operates on multiple channels, generally using frequency division multiplexing (FDM). FDM assigns one band for upstream data transmission and another band for downstream data transmission. FIG. 3 illustrates the frequency distribution of xDSL. As shown in FIG. 3, xDSL provides an approximate 4 kHZ region for POTS 300 at the DC end of the band. Upstream data 302 is multiplexed into the middle band and downstream data 304 is multiplexed at the higher band.

Turning back to FIG. 2, a first splitter 216 couples a telephone 200 and the modem 150 to the POTS line 202. As discussed previously, for U-ADSL transmission, the first splitter 216 would not be needed thus the telephone 200 and modem 150 can be coupled directly to the POTS line 202. The other end of the POTS line 202 is coupled to a second splitter 218 (the second splitter 218 is not needed for U-ADSL transmission) in a central office (CO) 204. For a standard voice transmission, the CO 204 routes (or switches) the voice transmission over the PSTN 206. For xDSL transmission, the CO 204 routes (or switches) the xDSL transmission to a CO modem 220. The CO modem 220 is coupled to a broadband network 208. Content providers 210, such as video on demand providers, live broadcast providers 214, and Internet Service Providers (ISPs) 212 are coupled to the broadband network 208.

Figure 4:
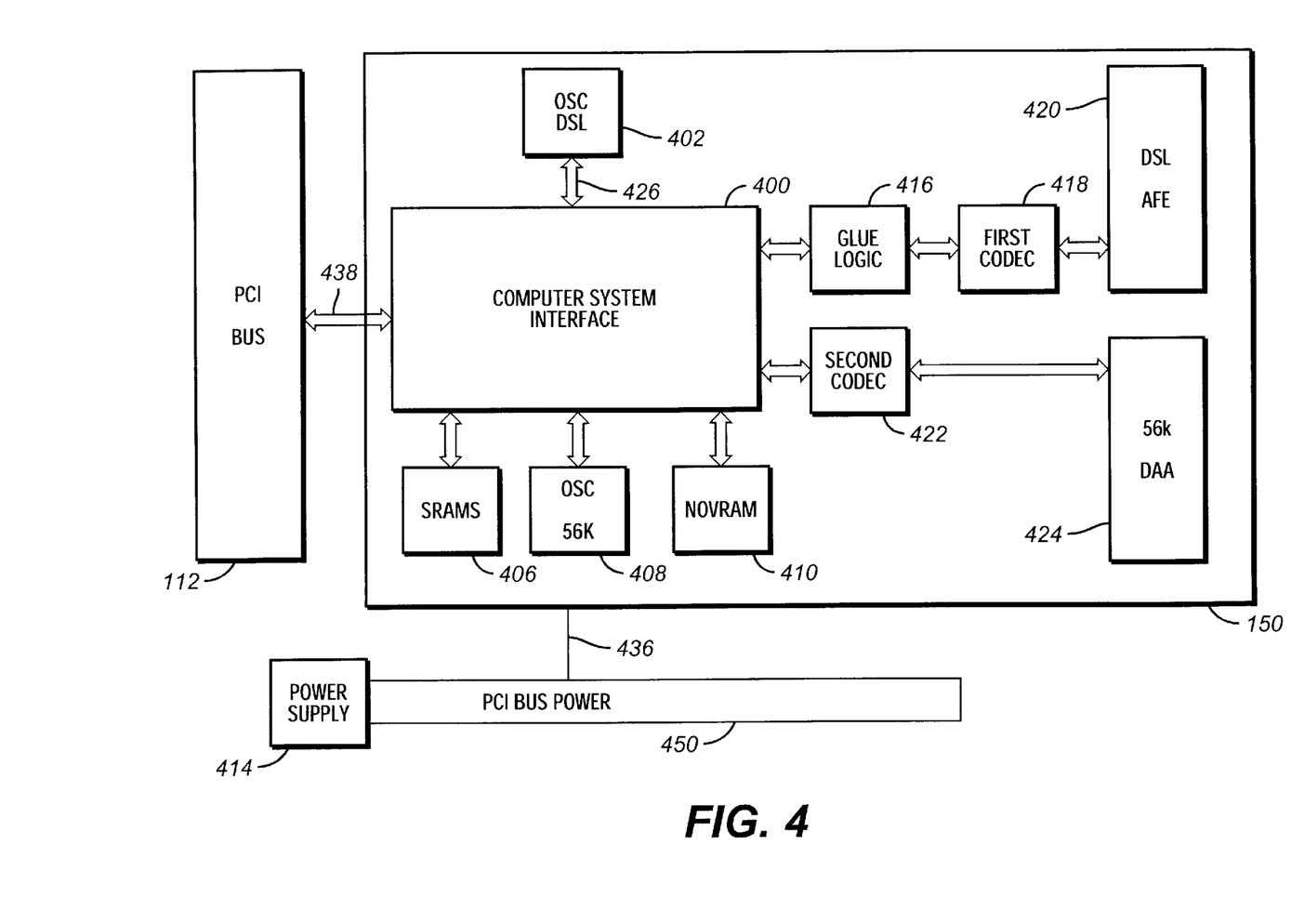
FIG. 4 is a block diagram of a modem card that operates in the computer system of FIG. 1, according to the present invention.

Next, FIG. 4 illustrates a block diagram of a modem according to the present invention. The modem 150 can operate in either a digital mode, such as ADSL or U-ADSL, or an analog mode, such as K56 flex or International Telecommunication Union (ITU) v.90. As specified in PCI standard v. 2.1, herein incorporated by reference in its entirety, a power supply 414 typically provides ±12, 5 and 3.3 volts to the PCI card devices, such as the modem 150, on the PCI bus power lines 450. The PCI standard specifies the available power to the PCI cards as follows:

| Power Rail | PCI card (short or long) |
|---|---|
| 5V +/− 5% | 5A max |
| 3.3V +/− .3V | 7.6 A max |
| 12V +/− 5% | 500 mA |
| −12V +/− 10% | 100 mA |

Figure 5:
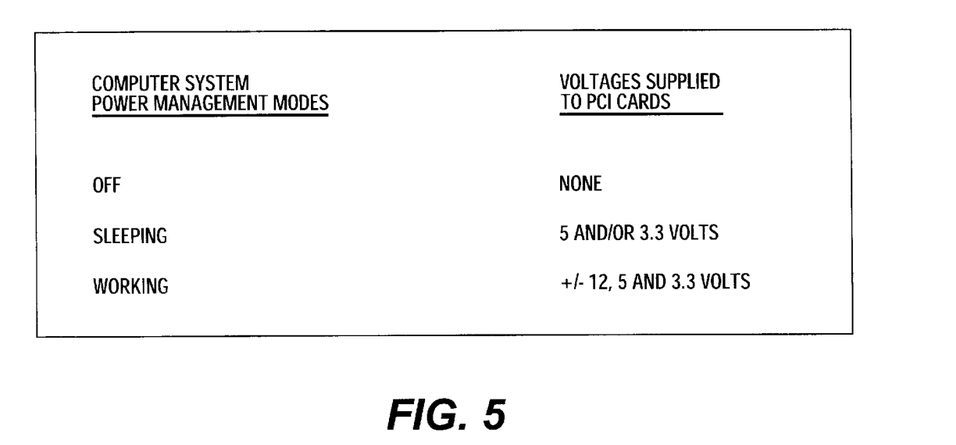
FIG. 5 illustrates the power management modes of the computer system of FIG. 1, according to the present invention.

The computer system C can operate in different power management modes as specified in industry standards Microsoft ONNOW specification and Intel/Microsoft/Toshiba Advanced Configuration and Power Interface (ACPI) specification. These industry standards specify among other things, a number of power management modes, such as an OFF mode, a SLEEPING mode, and a WORKING mode. As shown in FIG. 5, if the computer system C is in the OFF mode, the power supply 414 does not provide the ±12, 5 and 3.3 volts to the PCI cards, such as the modem card 150 via the PCI bus power lines 450. If the computer system C is in the ON mode, the power supply 414 provides ±12, 5 and 3.3 volts to the PCI cards, such as the modem card 150, via the PCI bus power lines 450. If the computer system C is in the SLEEPING mode, the power supply 414 provides 5 and/or 3.3 volts to the PCI card, such as the modem card 150, via the PCI bus power lines 450. Thus, the ±12 volts are typically unavailable to the PCI cards when the computer system C is in the SLEEPING mode.

The modem card 150 includes a computer system interface (CSI) 400, such as a Lucent Technology (Lucent Technology of Murray Hill, N.J.) 1690 Digital Signal Processor, that provides the data interface to the PCI bus 112 and digital signal processing for the modem card 150. Power is provided to the modem card 150 off the PCI bus power lines 450 via lines 436. The CSI 400 is coupled to the PCI bus 112 by a data bus 438. The CSI 400 is also coupled to memories, such as static random access memory (SRAM) 406 and non-volatile RAM (NOVRAM) 410. The NOVRAM 410 may store vendor ID, system resource requirements and other custom settings. The CSI 400 is also coupled to an oscillator DSL 402 for xDSL clocking signals and to a oscillator 56K 408 for analog data transmission (such as v.90) clocking signals.

Furthermore, the CSI 400 is coupled to a glue logic 416. A first codec 418 is coupled to the glue logic 416. The first codec 418 provides coding and decoding of xDSL signals. Because of the high transmission speed of xDSL signals between the CSI 400 and the first codec 418, the glue logic 416 provides control and a data interleaving buffer. The first codec 418 is coupled to an analog front end (AFE) 420. As will be explained in detail below, the AFE 420 provides the xDSL interface of the modem card 150 to the POTS line 202.

For analog data transmission, such as ITU v.90, a second codec 422 is coupled to the CSI 400. The second codec 422 provides coding and decoding of analog data transmission signals. The second codec 422 is coupled to a direct access arrangement (DAA) 424. The DAA 424 provides an interface for the modem card 150 to the POTS line 202 for analog data transmission.

Figure 6:
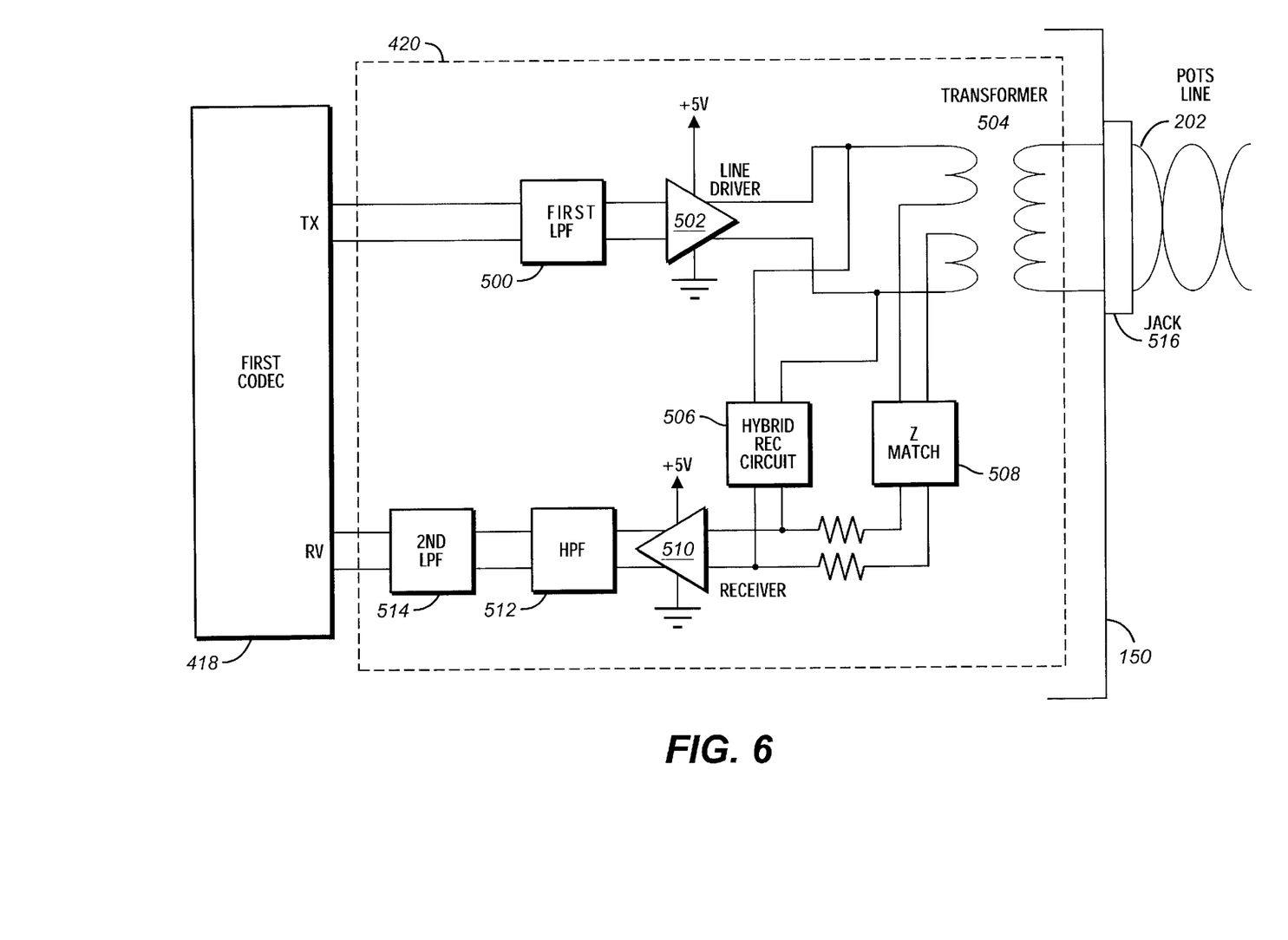
FIG. 6 is a block diagram of an analog front end of the modem card of FIG. 4, according to the present invention.

Next, FIG. 6 is a block diagram of an analog front end for xDSL transmission, according to the present invention. The transmit signal portion of the first codec 418 is differentially line coupled to a first low pass filter (LPF) 500. The first LPF 500 is differentially line coupled to a differential line driver 502, such as a Burr-Brown (of Tucson, Ariz.) DRV 1100 amplifier. The differential line driver 502 operates on 5 volts from the power supply 414 via the PCI bus power lines 450. The differential line driver 502 is coupled to a transformer 504. The transformer 504 provides the step up voltages for driving the xDSL signals over the POTS line 202, as well as line isolation. The transformer 504 is coupled to a telephone jack 516, such as a RJ11 jack. The telephone jack 516 provides a receptacle for the POTS line 202.

For receiving xDSL signals form the POTS line 202, the transformer 504 is also differentially line coupled to a hybrid receiving circuit 506 and an impedance matching circuit 508. The hybrid receiving circuit 506 provides a rejection of transmit xDSL signals from the line driver 502, while providing a low noise pre-amplification for the xDSL receive signals from the transformer 504. In addition, the hybrid receiving circuit 506 and the impedance matching circuit 508 provide an impedance for reducing signal line reflections. Also, the hybrid receiving circuit 506 and impedance matching circuit 508 are differentially line coupled to a line receiver 510, or high speed low noise amplifier such as a Burr-Brown OPA 660 operational amplifier. The receiver 510 operates on 5 volts from the power supply 414 via the PCI bus power lines 450. The receiver 510 is differentially line coupled to a high pass filter (HPF) 512. The HPF 512 is differentially line coupled to a second LPF 514. Next, the second LPF 514 is differentially line coupled to a receiver portion of the first codec 418.

Figure 7:
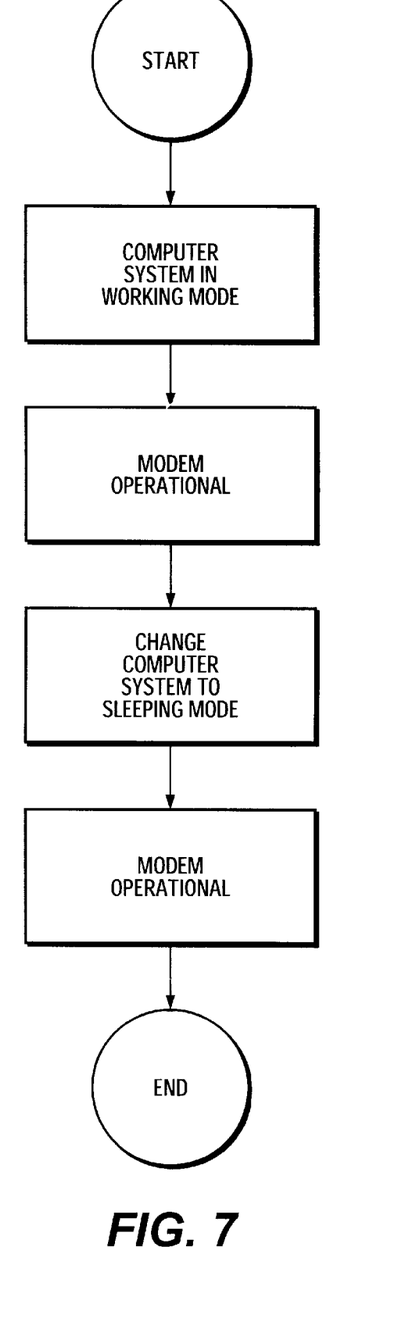
FIG. 7 is a flow chart of the operation of the modem card of FIG. 4.

FIG. 7 is a flow chart illustrating the operation of the modem card according to the present invention. The operation of the modem card 150 starts at step 600. The computer system C is in the WORKING power management mode, at step 602. The modem card 150 is operational, i.e., capable of sending and receiving xDSL data, such as U-ADSL data, at step 604. Next, at step 606, the computer system C goes into the SLEEPING power management mode. The computer system C can go into the SLEEPING power management mode if the computer system C's sleep button is depressed or after a pre-determined time has elapsed without user activity. While in the SLEEPING power management mode, at step 608, the modem card 150 remains operational, i.e., maintaining a link connection and capable of sending or receiving xDSL data. Power is provided as described above for the modem card 150 at this time. The method ends at step 610, or when the sleeping mode is ended.

The foregoing disclosure and description of the invention are illustrative and explanatory thereof, and various changes in the details of the illustrated apparatus and construction and method of operation may be made without departing from the spirit of the invention.

What is claimed is:

1. A computer system having a plurality of power management modes, including a sleep mode, the computer system comprising:
   a processor;
   a bus coupled to the processor;
   a memory coupled to the bus; and
   a modem card coupled to the bus, comprising:
      a computer system interface coupled to the bus;
      a codec connected to said computer system interface; and
      an analog front end (AFE) coupled to the codec for providing a telephone line interface to the computer system interface, and the analog front end is operable during the sleep mode using a regulated 5 volt power supply without the need for a 12 volt power supply.

2. The computer system of claim 1 wherein the modem card is a peripheral component interconnect (PCI) x digital subscriber line (xDSL) modem card.

3. The computer system of claim 2 wherein the modem card is a peripheral component interconnect (PCI) universal - asymmetric digital subscriber line (U-ADSL) modem card.

4. The computer system of claim 1 wherein the modem card is a dual mode modem.

5. The computer system of claim 4 wherein the dual mode of the modem card comprises an analog and digital mode.

6. The computer system of claim 5 wherein the digital mode is an xDSL mode.

7. The computer system of claim 5 wherein the digital mode is an U-ADSL mode.

8. The computer system of claim 5 wherein the analog mode is an ITU v.90 mode.

9. The computer system of claim 1 wherein the plurality of power management modes comprises a working mode, a sleeping mode, and an off mode.

10. The computer system of claim 1 wherein the plurality of power management modes are specified in Microsoft ONNOW and Intel/Microsoft/Toshiba ACPI specifications.

11. The computer system of claim 1 wherein the computer system interface is a PCI interface.

12. The computer system of claim 1 wherein the modem card further comprises:
   a second codec coupled to the computer system interface; and
   a direct access arrangement (DAA) coupled to the second codec for providing a second telephone line interface to the computer system interface.

13. A modem card having a plurality of power management modes, including a sleep mode, for communications over a telephone line, the modem comprising:
   a computer system interface;
   a codec connected to said computer system interface;
   an analog front end (AFE) coupled to said codec for providing a telephone line interface to the computer system interface, and the analog front end during the sleep mode using a regulated 5 volt power supply without the need for a 12 volt power supply.

14. The modem card of claim 13 wherein the modem card is a PCI xDSL modem card.

15. The modem card of claim 13 wherein the modem card is a PCI U-ADSL modem card.

16. The modem card of claim 13 wherein the modem card is a dual mode modem card.

17. The modem card of claim 16 wherein the dual modes of the modem card comprises a digital mode and an analog mode.

18. The modem card of claim 17 wherein the digital mode is an xDSL mode.

19. The modem card of claim 17 wherein the digital mode is an U-ADSL mode.

20. The modem card of claim 17 wherein the analog mode is an ITU v.90 mode.

21. The modem card of claim 13 wherein the plurality of power management modes comprises:
   a working mode; and
   a sleeping mode.

22. The modem card of claim 13 wherein the computer system interface is a PCI interface.

23. The modem card of claim 13 further comprises:
   a second codec coupled to the computer system interface; and
   a direct access arrangement (DAA) coupled to the second codec for providing a second telephone line interface to the computer system interface.

* * * * *